3,118,890
PROCAINE OROTATE
Edgar A. Ferguson, Jr., Brooklyn, N.Y., assignor to
William L. Gould, Albany, N.Y.
No Drawing. Filed July 24, 1961, Ser. No. 125,936
1 Claim. (Cl. 260—256.4)

The present invention relates to a new procaine derivative, and more particularly to the new compound procaine orotate which has a prolonged action as compared to procaine and the known derivatives of procaine such as procaine hydrochloride.

The known procaine acid addition salts such as procaine hydrochloride and procaine nitrate are widely used as local anesthetics, mainly by injection and for some purposes orally. While these compounds are highly effective, it has been desired to provide compounds which act in the same manner, however for a longer period of time.

It is accordingly a primary object of the present invention to provide a new procaine derivative which acts similarly to known procaine derivatives such as procaine hydrochloride, but which has a prolonged action which is markedly longer than that of procaine hydrochloride and the like.

Other objects and advantages of the present invention will be apparent from a further reading of the specification and of the appended claim.

With the above and other objects in view, the present invention mainly comprises the compound procaine orotate, which is the acid addition salt of orotic acid on procaine, and which has the following formula:

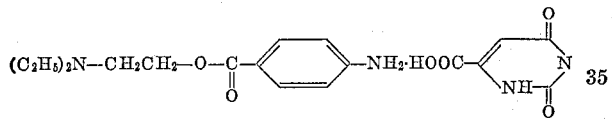

The procaine orotate of the present invention may be produced by boiling procaine base with orotic acid. The compound may be used as a local anesthetic in the form of a 1–5% solution, and most preferably in the form of a 2% solution.

The following example is given to illustrate the production of procaine orotate. The scope of the invention is not, however, meant to be limited to the specific details of the example.

Example 2.37 g. procaine base are dissolved in 200 cc. of boiling water. While the solution is boiling, 1.57 g. of orotic acid are added and the reaction mixture is boiled under refluxing for 5 minutes until a solution is formed.

The resulting solution is evaporated to dryness at 100° C. leaving a residue of a white somewhat crystalline powder. The compound, procaine orotate, has a molecular weight of 392.4 and melts at 153–156° C. It decomposes at 295° C.

The compound is soluble in water and may be used in the form of solutions for injection purposes.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claim.

What is claimed as new and desired to be secured by Letters Patent is:

Procaine orotate.

References Cited in the file of this patent
UNITED STATES PATENTS

| | | |
|---|---|---|
| 2,268,915 | Wastl et al. | Jan. 6, 1942 |
| 2,547,782 | Rhodehamel | Apr. 3, 1951 |
| 2,726,259 | Simonoff | Dec. 6, 1955 |
| 2,748,122 | Burtner | May 29, 1956 |
| 2,796,417 | Baker et al. | June 18, 1957 |
| 2,838,439 | Goldberg | June 10, 1958 |

OTHER REFERENCES

Minowa: Chem. Abstracts, 53: 22765c (1959).
Minowa: Chem. Abstracts, 53: 10670h (1959).